United States Patent [19]

Ohno et al.

[11] Patent Number: 4,546,958
[45] Date of Patent: Oct. 15, 1985

[54] LEAF SPRING

[75] Inventors: Akira Ohno; Yasushi Itakura, both of Yokohama; Takayuki Tabe, Tokyo; Shuji Hiromoto, Yokohama, all of Japan

[73] Assignee: NHK Spring Co., Ltd., Yokohama, Japan

[21] Appl. No.: 610,188

[22] Filed: May 15, 1984

Related U.S. Application Data

[63] Continuation of Ser. No. 329,032, Dec. 9, 1981, abandoned.

[30] Foreign Application Priority Data

Dec. 22, 1980 [JP] Japan .................. 55-181524

[51] Int. Cl.⁴ .............................................. F16F 1/18
[52] U.S. Cl. ..................................... 267/47; 267/148
[58] Field of Search ............. 267/47, 7, 16, 18, 19 R, 267/19 A, 36 R, 36 A, 40, 48, 54 R, 148, 149, 160, 164, 28; 124/23 R, 24 R, 25; 272/66

[56] References Cited

U.S. PATENT DOCUMENTS

| 129,297 | 7/1882 | Saladee | 267/47 |
|---|---|---|---|
| 2,533,511 | 12/1950 | Rowland et al. | 267/47 |
| 2,820,625 | 1/1958 | Davis | 267/158 |
| 3,452,974 | 7/1969 | Dixon | 267/47 |
| 3,495,816 | 2/1970 | Lyle | 267/158 |
| 3,705,718 | 12/1972 | Fukui et al. | 267/47 |
| 3,945,625 | 3/1976 | Duchemin | 267/47 |

FOREIGN PATENT DOCUMENTS

| 1231967 | 1/1967 | Fed. Rep. of Germany . | |
|---|---|---|---|
| 0722205 | 3/1932 | France . | |
| 2364165 | 4/1978 | France . | |
| 31885 | 12/1969 | Japan . | |
| 55574 | 12/1977 | Japan . | |
| 0147158 | 12/1978 | Japan | 267/158 |
| 0086935 | 7/1980 | Japan | 267/148 |
| 0532698 | 1/1941 | United Kingdom . | |
| 0576388 | 4/1946 | United Kingdom . | |
| 1099136 | 1/1968 | United Kingdom . | |
| 1151585 | 5/1969 | United Kingdom . | |
| 2041489 | 9/1980 | United Kingdom . | |
| 0819443 | 4/1981 | U.S.S.R. | 267/158 |

Primary Examiner—Bruce H. Stoner, Jr.
Assistant Examiner—Robert J. Oberleitner
Attorney, Agent, or Firm—Frishauf, Holtz, Goodman & Woodward

[57] ABSTRACT

In a FRP leaf spring consisting of a main body and a rib, the main body has a taper portion so tapered that the thickness of the main body varies continuously along the longitudinal direction thereof, and the rib is projected integrally from the main body in the direction of the thickness thereof, extending along the longitudinal direction of the main body, so that the total sectional area of the main body and the rib, as well as the width of the main body, is kept substantially fixed in every position along the longitudinal direction to ensure uniform stress distribution.

12 Claims, 17 Drawing Figures

FIG. 1
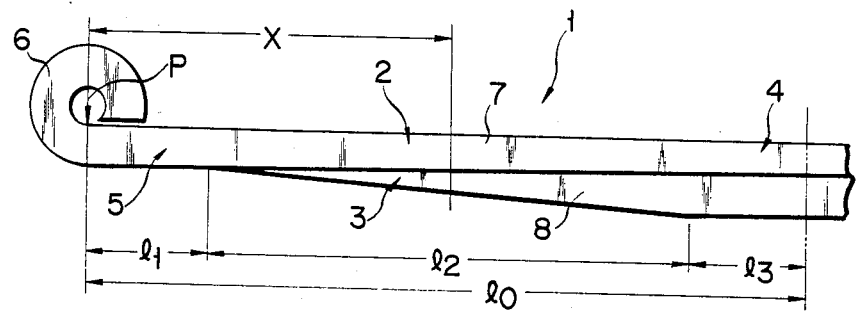
FIG. 2
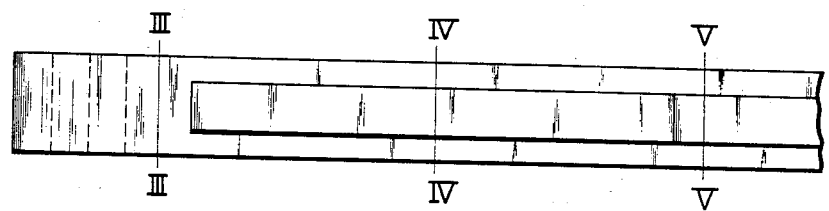
FIG. 3    FIG. 4    FIG. 5
 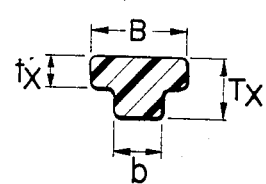 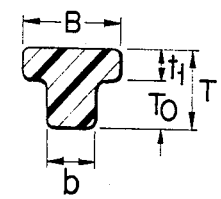

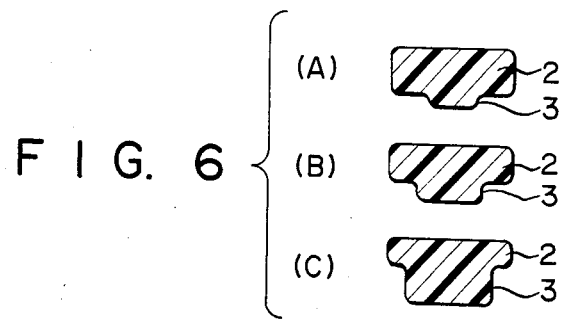
FIG. 7
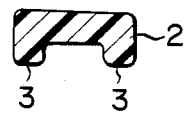
FIG. 8
FIG. 9
FIG. 10
FIG. 11
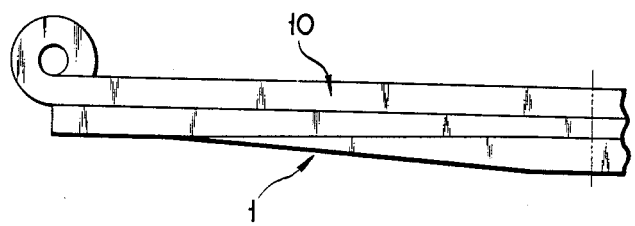

LEAF SPRING

This application is a continuation of application Ser. No. 329,032, filed Dec. 9, 1981 now abandoned.

BACKGROUND OF THE INVENTION

(1) Field of the Invention

This invention relates to a leaf spring, more specifically to a leaf spring having its width and sectional area substantially fixed in every position along its longitudinal direction.

(2) Description of the Prior Art

Conventionally, leaf springs used in car suspension systems, etc., are chiefly made of steel. To provide lighter leaf springs, however, steel as the material for the springs is being replaced by FRP (fiber reinforced plastic). In a prior art steel leaf spring, which has fixed Young's modulus throughout the length thereof, the sectional configuration can be varied according to the position to ensure uniform stress distribution without causing any confusion in design.

For uniform stress distribution, even a FRP leaf spring needs to have its sectional configuration varied according to the position by, for example, tapering. In a method for continuously manufacturing FRP leaf springs by continuously extruding a mixture of fibers and resin, which is highest in mass-producing capability, it is necessary to repeat continuously the increase and decrease of the amount of fibers and resin used in order to vary the sectional configuration as aforesaid. In such continuous production, however, the fibers used are continuous, so that it is impossible or very difficult to repeat the increase and decrease of the amount of fibers continuously. Even if only the amount of resin is to be varied, the fixed amount of fibers used will set limits to the variation of the amount of resin used. Moreover, the amount of heat produced by a heating device need be continuously varied according to the amount of resin. In any case, the construction of the device, as well as the control thereof, will be complicated in some measure. Even though only the amount of fibers can be varied, the Young's modulus of the leaf spring will fail to be fixed throughout its length unless the fiber content is fixed in every position along the length. Accordingly, the design calculation cannot help being complicated.

With the sectional area kept fixed, the leaf spring, like a corvette type leaf spring as shown in FIG. 14, will be changed in width as its thickness is changed. If the end portion of the spring is thinned, then the width thereof will be increased to enlarge the components of the suspension system, thereby prohibiting the mounting thereof or causing interference with a tire chain or the like to constitute a hindrance to uniform stress distribution (see FIG. 14).

SUMMARY OF THE INVENTION

Accordingly, the object of this invention is to provide an FRP leaf spring having substantially fixed width and sectional area throughout the length of its effective portion, and having its geometrical moment of inertia and section modulus varied along the longitudinal direction, thus enjoying uniform stress distribution.

BRIEF DESCRIPTION OF THE DRAWINGS

FIGS. 1 and 2 are a side view and a bottom view, respectively, of a leaf spring according to an embodiment of this invention;

FIGS. 3, 4 and 5 are sectional views taken along lines III—III, IV—IV and V—V of FIG. 2, respectively;

FIGS. 6(A), 6(B), 6(C), 7, 8, 9 and 10 are diagrams illustrating modifications of the principal parts of the lead spring;

FIG. 11 is a side view showing another embodiment of the invention;

DETAILED DESCRIPTION OF THE PREFERRED EMBODIMENTS

Figure 12:
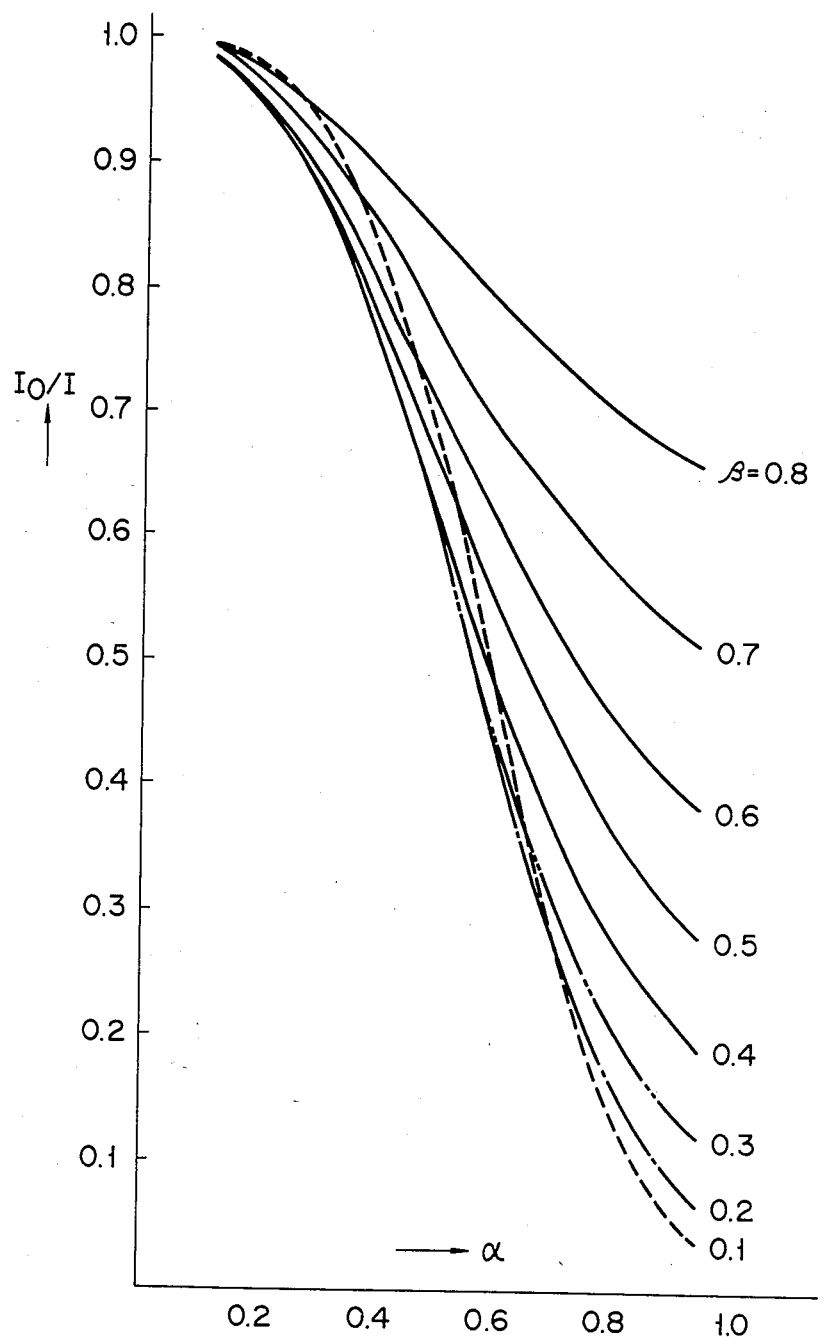
FIGS. 12 and 13 are graphs for illustrating the distribution of the moment of inertia and section modulus.

Now there wil be described an embodiment of this invention. Referring now to FIGS. 1 to 5, there is shown a leaf spring 1 which, formed integrally out of FRP (fiber reinforced plastic), includes a beltlike main body 2 and a rib 3 extending along the longitudinal direction and projected in the direction of the thickness of the lead spring 1. The leaf spring 1 is so designed that its base portion 4 may be supported by a suitable means (not shown), such as a car suspension system, and that its free end portion 5 may be coupled to the body side of a car by means of an eye portion 6 to bear load P. The eye portion 6 may be formed of a metal member separate from the main body 2 and fixed thereto by means of a bolt, or of a plastic member integral with the main body 2.

The main body 2 has a substantially fixed width B throughout its effective length $l_0$, and also substantially fixed thicknesses $t_1$ and $t_0$ at portions corresponding to the ranges of a length $l_3$ at the base portion 4 and a length $l_1$ at the free end portion 5, respectively. A taper portion 7 tapered toward the base portion 4 extends correspondingly to a length $l_2$ between the base portion 4 and the free end portion 5.

The rib 3 has a substantially fixed width b throughout its effective length $l_0$, and also a substantially fixed thickness $T_0$ at the base portion 4. A taper portion 8 tapered toward the free end portion 5 extends correspondingly to the length $l_2$.

In the leaf spring 1, the sectional area $b(T_x - t_x)$ of the rib 3 is set in relation to the sectional area $Bt_x$ of the main body 2 so that the total sectional area $Bt_x + b(T_x - t_x)$ of the main body 2 and the rib 3 is substantially fixed throughout the effective length $l_0$ (see FIG. 4). Using the symbols shown, we have $$Bt_0 = Bt_x + b(T_x - t_x) = Bt_1 + bT_0. \quad (1)$$

Suppose, for the ease of understanding, B, b, $t_0$, $t_1$ and $T_0$ are constant and $a = T_0/T$ and $b = b/B$ are given. Then eq. (1) may be rewritten as follows:

$$t_0 = (1-\beta)t_x + \beta T_x = t_1 + \alpha\beta T. \quad (2)$$

From eq. (2), we may obtain $$t_0/T = 1 + \alpha\beta - \alpha. \quad (3)$$

As may be seen from eq. (1) or (2), the thickness $t_x$ of the main body 2 and the total thickness $T_x$ of the leaf spring 1 at a distance x ($l_1 \leq x \leq l_1 + l_2$) from the center of the eye portion 6 are homogeneous functions of x. If the taper portions of the main body 2 and the rib 3 are rectilinearly tapered so that the total thickness $T_x$ may be given by $$t_x = t_0 + (T - t_0)(x - l_1)/l_2, \quad (4)$$

then the thickness $t_x$ will be given by $$t_x = t_0 - \alpha\beta T(x - l_1)/l_2 \quad (5)$$

because the sectional area of the leaf spring 1 is fixed. Thus, the thickness of those several portions of the leaf spring 1 shown in FIGS. 3 and 4 are determined in accordance with eqs. (3), (4) and (5).

Note: Demonstration of eq. (5)

Since the sectional area of the leaf spring is fixed, we have $$Bt_0 = Bt_x + b(T_x - t_x) = (B - b)t_x + bT_x.$$

Substituting the right side of eq. (4) for $T_x$ in this eq., we obtain $$Bt_0 = (B - b)t_x + b\{t_0 + (T - t_0)(x - l_1)/l_2\},$$

and hence $$t_x = t_0 + \frac{b(T - t_0)}{b - B}(x - l_1)/l_2.$$

Substituting $(t_1 + \alpha\beta T)$ from eq. (2) for $t_0$ in this eq., we obtain $$\frac{b(T - t_0)}{b - B} = \frac{b(T - t_1 - \alpha\beta T)}{b - b/\beta}.$$

Since we have $T = T_0/\alpha$ and $T - t_1 = T_0$, as may be seen from FIG. 5, we obtain $$\frac{b(T - t_0)}{b - B} = \frac{T_0 - \alpha\beta \frac{T_0}{\alpha}}{1 - 1/\beta}$$

$$= \frac{T_0(1 - \beta)\beta}{\beta - 1}$$

$$= -\alpha\beta T.$$

As a result, we obtain $$t_x = t_0 - \alpha\beta T(x - l_1)/l_2. \quad (5)$$

The ratio of the moment of inertia $I_0$ at the free end portion 5 of the leaf spring 1 to the moment inertia I at the base portion 4, and the ratio of the section modulus $Z_0$ at the free end portion 5 to the section modulus Z at the base portion 4 are given, using the symbols defined above, respectively by $$\frac{I_0}{I} = \frac{\{1 - \alpha(1 - \beta)\}^2}{\Delta}, \text{ and} \quad (6)$$

$$\frac{Z_0}{Z} = \frac{\{1 - \alpha(1 - \beta)\}^2\{(1 - \alpha)^2(1 - \beta) + \alpha\}}{\Delta}. \quad (7)$$

Here $$\Delta = 4\{1 - \alpha(1 - \beta)\}\{(1 - \alpha)^3(1 - \beta) = \beta\} - 3\{(1 - \alpha)^2(1 - \beta) = \beta\}^2. \quad (8)$$

Figure 13:
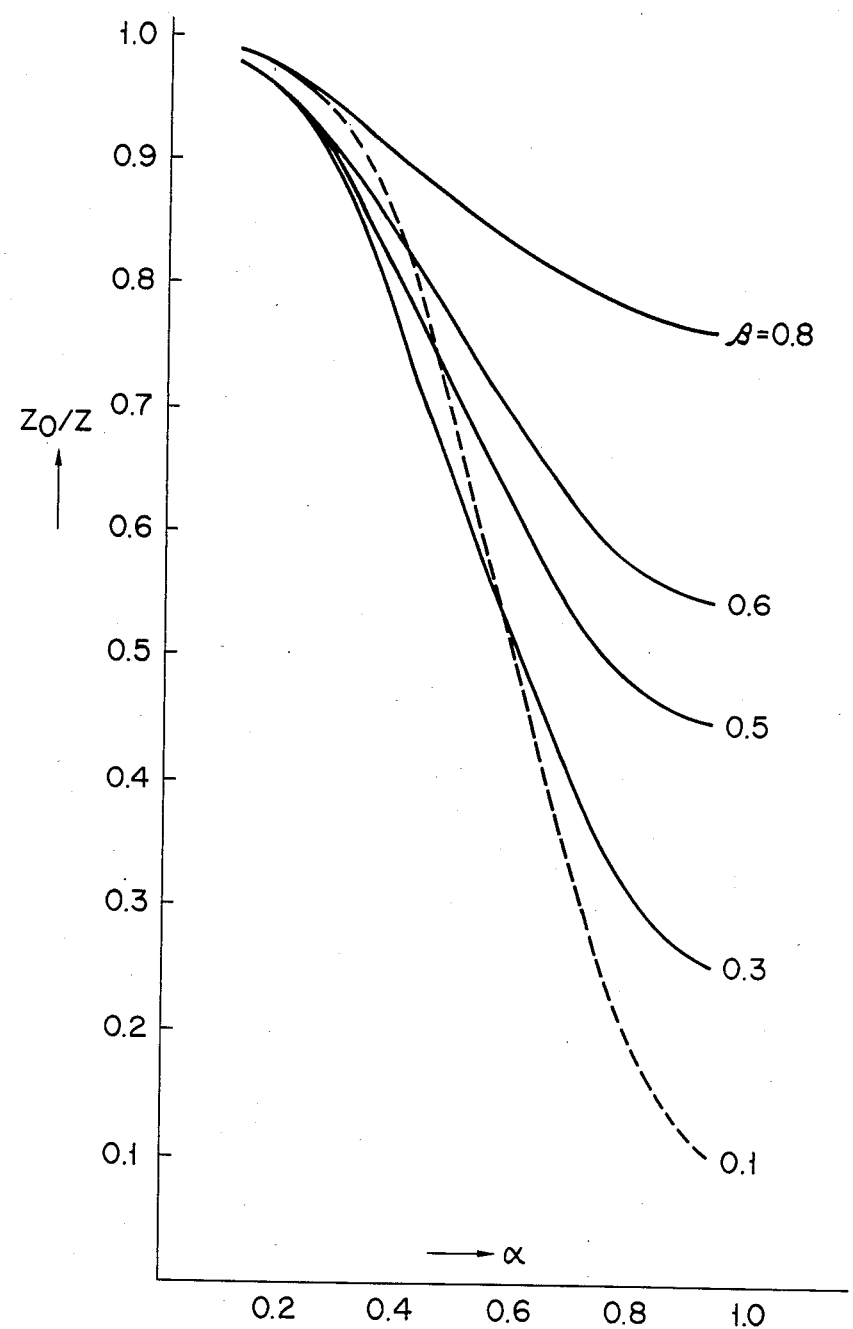
Figure 14:
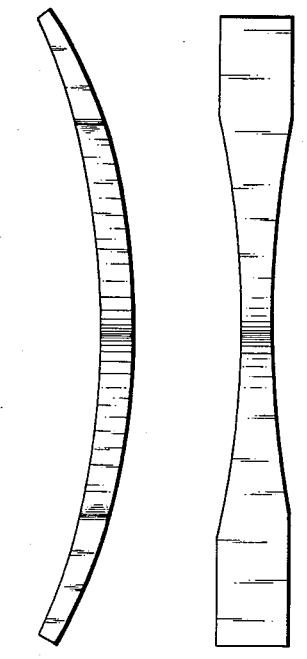
FIGS. 14(A) and 14(B) are a side view and a plan view, respectively, of a prior art corvette type leaf spring.

FIGS. 12 and 13 show the relationship between $\alpha$ and the ratios $I_0/I$ and $Z_0/Z$ with $\beta$ as a parameter. As may be seen from these graphs, the ratios $I_0/I$ and $Z_0/Z$ can be set selectively over a wide range by suitably setting the values $\alpha$ and $\beta$.

When the vertical load P is applied to the free end of the cantilever-shaped spring, the bending moment M at a distance X from the fixed end is given by $$M = -P(l - x),$$

and the maximum $\sigma$ of bending stress generated by the bending moment M is $$\sigma = |-P(l - x)|/Z. \quad (9)$$

Since Z can be changed according to the change of the distance x, the value $\sigma$ of eq. (9) can be kept substantially fixed in any position. Thus, there may be obtained a cantilever with uniform strength. It is to be understood, from the spirit of this invention, that Z should be changed with the width B kept substantially constant and with $T_x$, $t_x$ and b varied. The same is true of I.

Accordingly, the stress distribution can be rendered uniform, and the leaf spring obtained can be reduced in weight. It is possible, moreover, to massproduce FRP leaf springs with fixed Young's modulus attributable to the fixed sectional area.

By way of example, a leaf spring with spring constant of 8 kg/mm was formed out of FRP with Young's modulus E of 4,200 kg/mm$^2$ and specific gravity $\gamma$ of 1.92, using $l_0 = 570$ mm and $P = 1,300$ kg. The maximum stress $\sigma$ (kg/mm$^2$) and the gross weight W (kg) of this example obtained with use of B = 60 and T = 28 shown in division A of the table below.

| Division | $\sigma$ | W |
|---|---|---|
| A | 54.0 | 2.79 (12.7%) |
| B | 54.8 | 3.41 (15.5%) |
| C | 51.0 | 4.76 (21.6%) |
| D | 85.0 | 22.0 (100.0%) |

In this table, divisions B and C represent controls formed out of FRP with the same properties of the material for the aforesaid example. The control B is a tapered spring with its sectional configuration kept rectangular and its sectional area fixed, while the control C is a composite structure obtained by combining two leaf springs each having fixed width (60 mm) and fixed thickness (18 mm). In the control B, the width and thickness of the base portion are 60 mm and 26 mm, respectively, while the width of the free end portion is as large as 152 mm. Moreover, both the maximum stress and weight of the control B are greater than those of the example A, and those of the control C are further greater. In the table division D represents an example made of steel (E = 21,000 kg/mm$^2$, $\gamma = 7.85$) in conformity with the aforesaid conditions. This example was formed by joining together nine leaf springs each having fixed width (60 mm) and fixed thickness (7 mm) (uneven in length).

This invention is not limited to the above-mentioned embodiment. For example, the leaf spring 1 may be formed out of any other suitable material than FRP. Further, the width b of the rib 3 need not always be fixed, and may vary along its longitudinal direction, as illustrated in FIGS. 6(A), 6(B) and 6(C). After all, the sectional configuration or the number of ribs may be set optionally. As shown in FIG. 7, for example, two ribs may be formed on either side of the main body 2 across the width thereof. Alternatively, as shown in FIG. 8, a plurality of ribs may be formed at spaces. As shown in FIG. 9, or 10, moreover, the rib may have an arcuate or wavy sectional configuration. In any of these cases, the rib(s) may be formed on one or either side of the main body 2 across the thickness thereof. As shown in FIG. 11, furthermore, the leaf spring 1 according to this invention may be joined with another leaf spring 10 made of steel or FRP.

As described above, this invention is characterized in that a taper portion with its thickness varied in relation to its length and an integral longitudinal rib are formed on the main body of a leaf spring with a substantially fixed width, and that the sectional area of the rib is set in relation to that of the main body so that the total sectional area of the main body and the rib is substantially fixed in every position along the longitudinal direction. Thus, there may be provided a leaf spring capable of lightweight design with uniform stress distribution, enjoying good space merit without interfering, in operation, with any other related equipment or members, such as brake cable and buffer, owing to its substantially fixed width, capable of easy mass production as an FRP member with fixed Young's modulus, and expressly suitable for use in a car suspension system and the like.

What we claim is:

1. A leaf spring used in an automotive motor vehicle suspension system, and molded of plastic material reinforced with a large number of embedded fibers running longitudinally therealong, comprising:

a single elongated main body of substantially constant width along the longitudinal direction thereof, said main body having end portions, a central portion and intermediate taper portions of substantial length between said end and central portions, and an elongated rib integrally extending from said main body in a direction perpendicular to the width direction of the main body, said single main body having a thickness which decreases gradually from the end portions thereof to the central portion thereof along the longitudinal direction thereof, the end portions being thicker than said central portion, and the thickness of at least said intermediate taper portions gradually varying in the longitudinal direction of said main body so that said intermediate taper portions are thicker adjacent said end portions than at said central portions, and said rib projecting integrally from said main body in the direction of the thickness of said main body and substantially perpendicular to said main body, said rib extending along the longitudinal direction of said main body over at least a major portion of the longitudinal length of said main body, said rib having a height, in the thickness direction of said main body, which gradually increases from the end portions to the central portion of said main body, and wherein the total cross sectional area of said main body and said rib and the width of said main body being respectively substantially constant at every position along the longitudinal direction of the leaf spring, whereby the stress at each portion of the intermediate taper portions is substantially uniform along the complete longitudinal length of the intermediate taper portions.

2. A leaf spring according to claim 1, wherein the rib has a width which is substantially constant along the longitudinal direction of the leaf spring.

3. A leaf spring according to claim 1, wherein the rib has a width which varies gradually along the longitudinal direction of the leaf spring.

4. A leaf spring according to claim 1, wherein said rib is formed on either side of said main body across the width thereof.

5. A leaf spring according to claim 1, wherein a plurality of said ribs are formed at spaces on said main body across the width thereof.

6. A leaf spring according to claim 1, wherein the cross-section of said rib is arcuate in shape.

7. A leaf spring according to claim 1, wherein the cross-section of said rib is wavy in shape.

8. A leaf spring according to claim 1, wherein said main body has side edges spaced from each other in the width direction, and comprising a plurality of said ribs formed along opposite sides of said main body and extending to the side edges of said main body, said ribs being spaced apart from each other in the width direction of said main body.

9. A leaf spring according to claim 1, comprising a pair of said ribs spaced from each other and integrally extending from said main body in the direction of the thickness of said main body, and ribs extending along the longitudinal direction of said main body.

10. A leaf spring according to claim 9, wherein said main body has side edges spaced from each other in the width direction and wherein said ribs are spaced inwardly at the side edges of said main body in the width direction of said main body, said ribs extending along said intermediate taper portions and said central portion of said leaf spring.

11. A leaf spring according to claim 1, wherein the thickness of said intermediate taper portions of said main body varies continuously along the longitudinal direction thereof.

12. A leaf spring according to claim 1, wherein said main body is substantially rectangular along substantially the entire length of the longitudinal direction of said leaf spring and said rib is of substantially constant width and projects from the center of the underside of said intermediate taper portions and central portion of said main body and has a height which is varied in accordance with the change in the cross-sectional area of the main body to make the total cross-sectional area of said main body of said rib substantially constant along the longitudinal direction of said main body.

* * * * *